US012697952B2

(12) United States Patent　　(10) Patent No.:　US 12,697,952 B2
Reuter et al.　　　　　　　　　(45) Date of Patent:　　　Aug. 4, 2026

---

(54) REDUNDANT BRAKE-BY-WIRE SYSTEM

(71) Applicant: BWI (Shanghai) Co., Ltd., Shanghai (CN)

(72) Inventors: David Fredrick Reuter, Beavercreek, OH (US); Daniel Norbert Borgemenke, Springboro, OH (US); Trevor Matthew Schlangen, Dayton, OH (US)

(73) Assignee: BWI (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 19/048,839

(22) Filed: Feb. 7, 2025

(65) Prior Publication Data

US 2026/0001518 A1　　Jan. 1, 2026

Related U.S. Application Data

(60) Provisional application No. 63/665,139, filed on Jun. 27, 2024.

(30) Foreign Application Priority Data

Nov. 29, 2024　(CN) ......................... 202411750416.5

(51) Int. Cl.
　　*B60T 8/94*　　　(2006.01)
　　*B60T 13/14*　　(2006.01)
　　*B60T 13/68*　　(2006.01)
(52) U.S. Cl.
　　CPC .............. *B60T 8/94* (2013.01); *B60T 13/148* (2013.01); *B60T 13/686* (2013.01); *B60T 2270/402* (2013.01); *B60T 2270/404* (2013.01)

(58) Field of Classification Search
　　CPC ................ B60T 13/148; B60T 13/686; B60T 2270/402; B60T 2270/404; B60T 8/32; B60T 8/88; B60T 8/92; B60T 8/94
　　See application file for complete search history.

(56) References Cited

U.S. PATENT DOCUMENTS 11,919,490 B2 *　3/2024　Alford .................... B60T 13/74
12,122,346 B2 *　10/2024　Kim ...................... B60T 13/662
(Continued)

FOREIGN PATENT DOCUMENTS

EP　　　　4382375 A1　　6/2024

OTHER PUBLICATIONS

Extended European Search Report issued on Oct. 7, 2025 for counterpart European patent application No. 25173222.8 (5 pages).

*Primary Examiner* — Carl C Staubach
(74) *Attorney, Agent, or Firm* — Dickinson Wright PLLC

(57) ABSTRACT

A brake system configured for use in a driverless vehicle. The system including a main controller, a first main unit provided with a first controller, and a second main unit provided with a second controller. The first main unit including a first brake circuit and a second brake circuit each including one or more valves configured to operate a first number of wheel brakes. The second main unit including a third brake circuit and a fourth brake circuit each configured to operate a second number of wheel brakes, the third brake circuit selectively fluidly connected to the first brake circuit and the fourth brake circuit selectively fluidly connected to the second brake circuit. The second controller configured to, responsive to the first controller malfunctioning, command the third brake circuit and the fourth brake circuit to operate the first and second number of wheel brakes.

20 Claims, 7 Drawing Sheets

(56) References Cited

U.S. PATENT DOCUMENTS

| 12,459,476 | B2 * | 11/2025 | Ahn | B60T 13/142 |
|---|---|---|---|---|
| 2021/0146900 | A1 * | 5/2021 | Einig | B60T 13/662 |
| 2022/0153241 | A1 * | 5/2022 | Tarandek | B60T 7/042 |
| 2023/0119335 | A1 * | 4/2023 | Zhao | B60T 13/686 |
| | | | | 303/3 |
| 2025/0042382 | A1 * | 2/2025 | Reuter | B60T 8/172 |
| 2025/0162555 | A1 * | 5/2025 | Kim | B60T 13/66 |

* cited by examiner

REDUNDANT BRAKE-BY-WIRE SYSTEM

CROSS-REFERENCE TO RELATED APPLICATIONS

This application claims the benefit of U.S. Provisional Application Ser. No. 63/665,139, filed Jun. 27, 2024, and Chinese Patent Application No. 202411750416.5, filed on Nov. 29, 2024, which are incorporated herein by reference in their entireties.

TECHNICAL FIELD

The present disclosure relates to brake systems, particularly electro-hydraulic brake systems configured for use in autonomous and semi-autonomous vehicles.

BACKGROUND

Certain vehicles may include a Brake-by-Wire (BBW) architecture to brake the vehicle. The BBW architecture may include vehicle master cylinder may operate in a normal mode, in which the master cylinder is totally isolated from the wheel brakes and is connected to a pedal feel emulator that replicates force, travel, and damping of a traditional brake system, or in a fallback mode, in which the master cylinder applies the brakes directly by a driver of the vehicle. Brake pedal travel and/or force along with the measured hydraulic brake pressure is used by the system as an input signal to the electronic control unit. The electronic control unit in turn sends a signal, based on the measured hydraulic pressure, to a pressure supply unit that may be composed of a high efficiency brushless motor and ball-screw assembly displacing one or more pistons. The applied pressure thus determines how fast and how hard the brakes are to be applied with the goal to replicate the driver's intended vehicle's instantaneous deceleration.

SUMMARY

The present disclosure provides an electro-hydraulic brake system configured for use in autonomous and semi-autonomous vehicles. The brake system may include one or more main units (e.g., two) such as a first unit and a second unit each configured to operate one or more wheel brakes. The two main units may each include an electronic control unit (ECU) that may receive commands from a private CAN to control the desired level of braking provided by the first unit and the second unit and each of the units may be interconnected by one or more cross-over connections to enable redundancy should one of the two units fail to operate as intended. A pressure supply unit (PSU) may be provided in each of the units and each of the PSUs may be fluidly connected to one or more control valves (e.g., twelve) some of which may be normally closed and some of which may be normally open.

According to another aspect of this disclosure, the PSUs may be substantially identical to one another. As an example, each PSU includes an identical motor, ball screw and piston configured to translate within a hydraulic bore capable of providing braking pressure to the wheel brakes.

According to another aspect of this disclosure, the brake system may be configured to operate in a number of modes such as base brake modulation, ABS release, in-stop ECU failure, and base brake failure.

According to yet another aspect of this disclosure, an electro-hydraulic brake system for use in a driverless vehicle is provided. The brake system may include a main controller, a first main unit and a second main unit. The first main unit may be configured to operate a front right wheel brake and a front left wheel brake, the first main unit may be provided with a first pressure supply unit (PSU), a first brake circuit, a second brake circuit, and a first controller. The second main unit may be configured to operate a rear left wheel brake and a rear right wheel brake and may be provided with a second pressure supply unit (PSU), a third brake circuit, a fourth brake circuit, and a second controller. The first brake circuit may be configured to receive pressurized fluid from the first PSU, the first brake circuit may include a first plurality of valves collectively configured to provide and receive pressurized fluid to and from the front right wheel brake. The second brake circuit may be configured to receive pressurized fluid from the first PSU, the second brake circuit may include a second plurality of valves that may be collectively configured to provide and receive pressurized fluid to and from the front left wheel brake. The first controller may be in communication with the main controller. The third brake circuit may be configured to receive pressurized fluid from the second PSU, the third brake circuit may include a third plurality of valves that may be collectively configured to provide and receive pressurized fluid to and from the rear right wheel brake, the third brake circuit may be selectively fluidly connected to the first brake circuit. The fourth brake circuit may be configured to receive pressurized fluid from the second PSU. The fourth brake circuit may include a fourth plurality of valves that may be collectively configured to provide and receive pressurized fluid to and from the rear left wheel brake, and the fourth brake circuit may be selectively fluidly connected to the second brake circuit. The first controller may be configured to, responsive to receiving a first base brake modulation command from the main controller, activate the first plurality of valves and the second plurality of valves to apply and release the front right wheel brake and the front left wheel brake. The second controller may be configured to, responsive to receiving a second base brake modulation command from the main controller, activate the third plurality of valves and the fourth plurality of valves to apply and release the rear right wheel brake and the rear left wheel brake.

DETAILED DESCRIPTION

Figure 1:
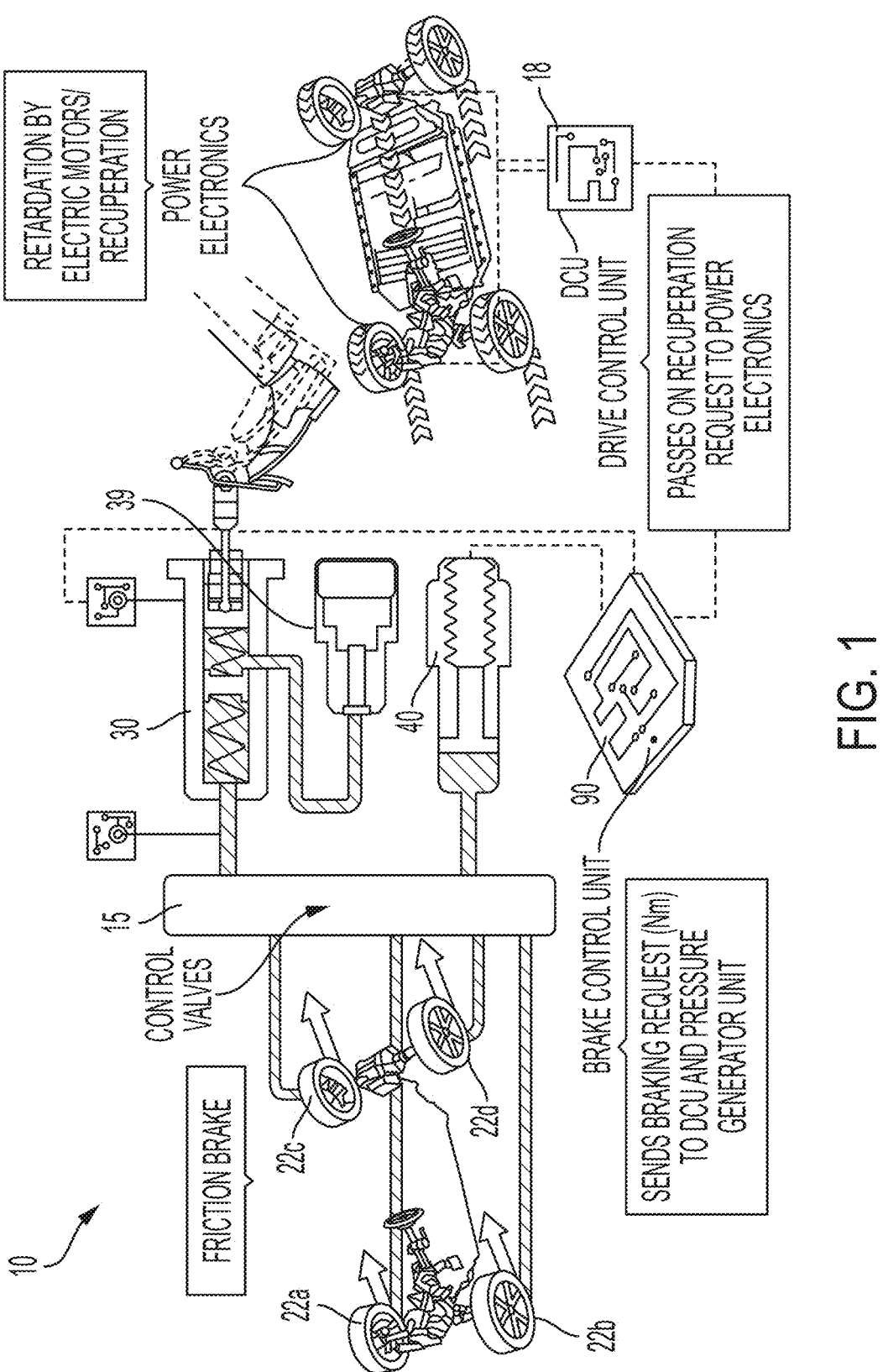
FIG. 1 illustrates a schematic diagram of a known brake-by-wire (B-b-W) architecture.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within +0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for case of description to describe one element or feature's relationship to another element(s) or feature(s)

as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 shows a schematic block diagram of a brake-by-wire (BbW) system 10 in a vehicle, such as an automobile, and which includes a plurality of wheel brakes 22a, 22b, 22c, 22d each having a corresponding actuator, such as a hydraulic cylinder. Basic brake-by-wire (BBW) architecture is now well-established in the automotive industry. The vehicle's master cylinder 30 either directly applies one or more of the wheel brakes 22a, 22b, 22c, 22d in a failed system fallback mode or is isolated from the wheel brakes 22a, 22b, 22c, 22d and connected to a pedal feel emulator (PFE) 39 that replicates force, travel, and damping of a traditional brake system. The brake pedal travel and/or force, and or brake pressure is used by the system 10 as an input signal to a brake electronic control unit (ECU) 90. It in turn sends the appropriate signal to a pressure supply unit (PSU) assembly 40. The PSU assembly 40 may include a high efficiency brushless motor and ball screw 60 assembly displacing one or more PSU pistons, which can be thought of as an electric master cylinder. The master cylinder 30 and/or the PSU assembly 40 may be coupled to the wheel brakes 22a, 22b, 22c, 22d via a series of control valves 15, which may include an apply valve and a release valve (not shown) for each of the wheel brakes 22a, 22b, 22c, 22d to provide functions such as antilock braking (ABS), electronic traction control, etc.

The brake pedal inputs define driver intent which determines how fast and how hard the brakes are applied with the goal to replicate the feel of a conventional vacuum booster brake system. The brake ECU 90 may also send a signal to a drive control unit (DCU) 18, which may also be called a powertrain control module (PCM) 18 to slow the vehicle using one or more electric motors in a regenerative mode.

Figure 2:
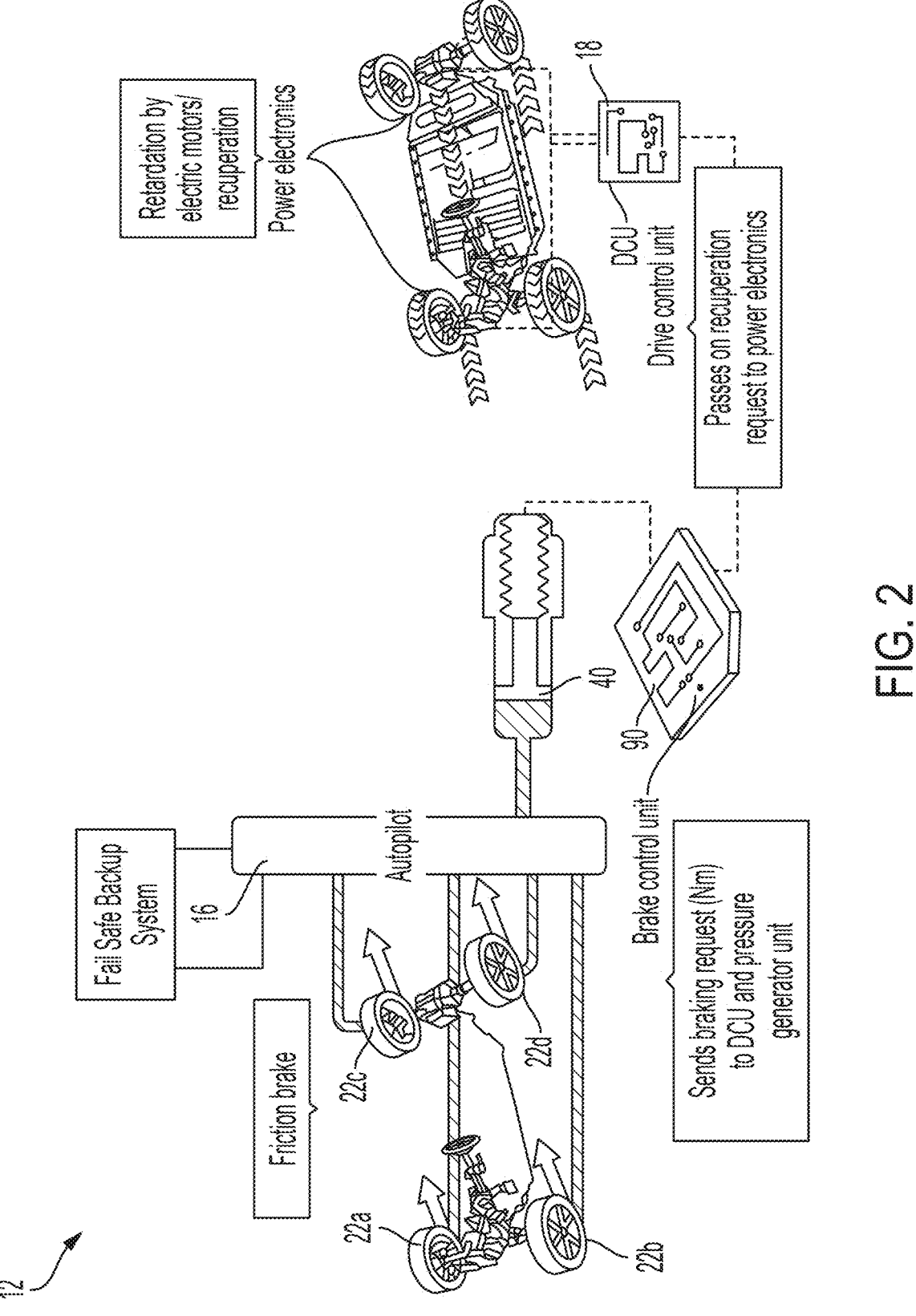
FIG. 2 illustrates a schematic diagram of the known B-b-W architecture modified for level four of the SAE levels of driving automation.

FIG. 2 illustrates a schematic diagram of an exemplary BBW architecture 12 modified for level four or five of the SAE levels of driving automation. The Society of Automotive Engineers initially launched SAE J3016™ Recommended Practice: Taxonomy and Definitions for Terms Related to Driving Automation Systems for On-Road Motor Vehicles, commonly referenced as the SAE Levels of Driving Automation™ which includes level 0 through level 5 of driving automation. SAE Level 4 eliminates the need for a driver and a number of operations are accomplished by the brake system (i.e. autopilot 16), those operations include: (1) monitoring driving environment; (2) executing vehicle steering, acceleration, and deceleration; and (3) fallback performance. Accordingly, the master cylinder 30 and pedal feel emulator 39 may be eliminated.

The vehicle is thus guided by an autopilot that measures the external environment and then executes the destination or route programmed. At Level 4 the system's capability, however, is limited by such factors as maximum allowable vehicle speed and permissible areas of operation. At Level 5 these limitations are removed and the vehicle must be able to self-navigate anywhere humans can drive. However, to meet the necessary brake system fallback requirements at level 4 there must be a second independent system capable of safely stopping the vehicle and allowing it to continue at some level of reduced operation. This may include maintaining dynamic rear proportioning and some level of axle-based ABS.

Figure 3:
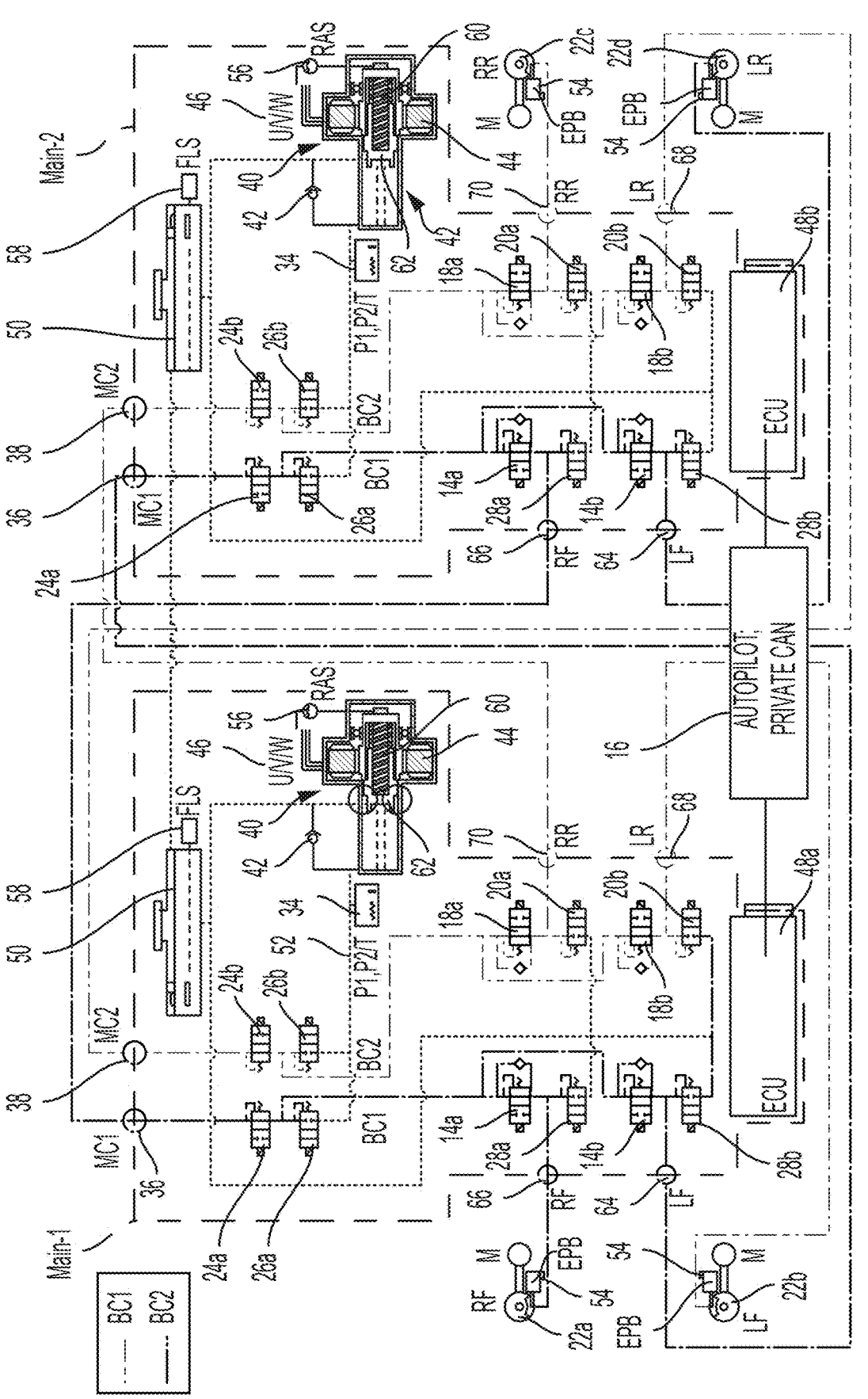
FIG. 3 illustrates a schematic diagram of a level four brake system according to one or more embodiments.

FIG. 3 shows a schematic diagram of an exemplary level four brake system according to one or more embodiments. The brake system includes two bake units identified as Main-1 and Main-2 and each of which are connected by a communications network, such as Controller Area Network (identified as "Autopilot Private CAN") through a first ECUs 48a of the first main unit Main-1 and a second ECU 48b of the second main unit Main-2 (collectively referred to as ECUs 48). The private CAN 16 may provide relatively fast uninterrupted communications between the two units Main-1, Main-2. Each of the units Main-1, Main-2 are connected to a plurality of brakes including a right front brake 22a, left front brake 22b, right rear brake 22c, and left rear brake 22d. The ECUs 48 of the two brake units Main-1 and Main-2 may receive commands from the private CAN 16 to control the desired or commanded level of braking provided by the first unit Main-1 and the second unit Main-2.

The ECUs 48 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the ECUs 48 in controlling the first and second units Main-1, Main-2, respectively. While the ECUs 48 may be comprised of substantially similar or identical hardware (e.g., memory devices referenced above), the ECU 48a of the first unit Main-1 may execute instructions (e.g., software) that are different than the instructions of the ECU 48b of the second unit Main-2.

As will be described in greater detail below, each of the units Main-1, Main-2 may include a plurality of valves and a plurality of ports. Because the valves and ports of the first unit Main-1 may be identical or substantially identical to those valves and ports of the second unit Main-2, only the valves and ports of the first unit Main-1 will be described for brevity. The plurality of valves may include release valve right rear 20a, release valve left rear 20b, release valve right front 28a, release valve left front 28b, apply valve right front 14a, apply valve left front 14b, apply valve right rear 32a, and apply valve left rear 32b. The plurality of ports may include a first master cylinder inlet port 36, a second master cylinder inlet port 38, a left front wheel port outlet 64, a right front wheel port outlet 66, a left rear port outlet 68, and a right rear wheel port outlet 70.

The first unit Main-1 includes a fluid reservoir 50 holding a hydraulic fluid to the first brake circuit BC1 and the second brake circuit BC2. A fluid level sensor 58, such as a float switch, monitors a level of the hydraulic fluid in the fluid reservoir 50. A pressure supply unit "PSU" includes an identical motor 44, ball screw 60 and piston 62, configured to translate within a hydraulic bore to supply the hydraulic fluid from the fluid reservoir 50 to the first and second brake circuits BC1, BC2. The motor 44 may be a three phase motor configured to receive electric power by way of motor stator leads 46.

An exemplary PSU assembly is provided in Applicant's U.S. Pub. No. 2023/0119335, which is hereby incorporated by reference. The PSU 40 may draw fluid from a return fluid passageway that is connected to the fluid reservoir 50 and which is maintained at or near ambient atmospheric pressure. In one or more embodiments, a PSU refill check valve 42, which may be a normally closed check valve, may be operable to permit the PSU 40 to draw fluid from the reservoir 50. A rotor angle sensor 56 may be coupled to the electric motor 44 to determine a position of the rotor in the motor, and thus a position of the PSU 40. A pressure and temperature sensor 34 may be disposed in a PSU fluid passageway 52 and configured to measure the temperature and pressure therein.

The PSUs 40 may be substantially identical to one another to enable both PSUs 40 to supply pressure to the wheel brakes at the same time which may enable use of the brake system on larger (e.g., non-passenger) vehicles. The first and second units Main-1, Main-2 are interconnected by a number of cross-over connections that may enable redundancy should one of the two units fail to operate as intended. In other words, should one of the units fail the other unit may still provide full function of ABS and electronic stability control (ESC) at each of the four wheel brakes. Each of the wheels may be powered by a drive motor 44 that may be configured to provide regenerative braking under certain circumstances. In addition to the drive motor M each of the wheels may include an electric park brake 54.

A first pressure supply unit valve 26a and a second pressure supply unit valve 26b may each be a normally closed control valves that may be arranged parallel to one another. Inlets of the first and second supply unit valves 26a, 26b may be fluidly connected to the outlet of the PSU 40 by way of the PSU fluid passageway 52. The outlet of the first supply unit valve 26a may define the first brake circuit BC1 and the outlet of the second supply unit valve 26b may define the second brake circuit BC2.

A first master cylinder isolation valve 24a and a second master cylinder isolation valve 24b may be normally open control valves that may be arranged parallel to one another. Outlets of the first and second master cylinder isolation valves 24a, 24b may be fluidly connected with the outlets of the first and second supply unit valves 26a, 26b, respectively. Inlets of the first and second master cylinder isolation valves 24a, 24b in Main-1 may be fluidly connected to wheel port outlets of the second main unit Main-2 such as the right front wheel port outlet 66 and the left rear wheel port outlet 68. Inlets of the first and second master cylinder isolation valves 24a, 24b of Main-2 may be fluidly connected to the wheel port outlets of the first main unit Main-1 such as left front wheel port outlet 64 and the right rear wheel port outlet 70 to complete the hydraulic cross-over connections between the two Main units. Such hydraulic cross-over connections may be routed through a first master cylinder inlet port 36 and a second master cylinder inlet port 38, respectively.

A plurality of apply and release valves may connect the first brake circuit BC1 and the second brake circuit BC2 to the wheel brakes 22a, 22b, 22c, 22d to selectively control fluid flow between the corresponding one of the of the wheel brakes and an associated one of the two brake circuits BC1, BC2. As an example, the first brake circuit BC1 may include an apply valve right front 14a, an apply valve left front 14b, the release valve right front 28*a*, and the release valve left front 16*b*. The second brake circuit BC2 may include an apply valve right rear 32*a*, an apply valve left rear 18*b*, a release valve right rear 20*a*, and a release valve left rear 20*b*. The apply valves 14, 32 and the release valves 20, 28 may collectively be called antilock brake system (ABS) valves for their use in such an ABS. However, the apply valves apply valves 14, 32 and the release valves 20, 28 may be used for other functions, such as for traction control and/or for torque vectoring.

Figure 4:
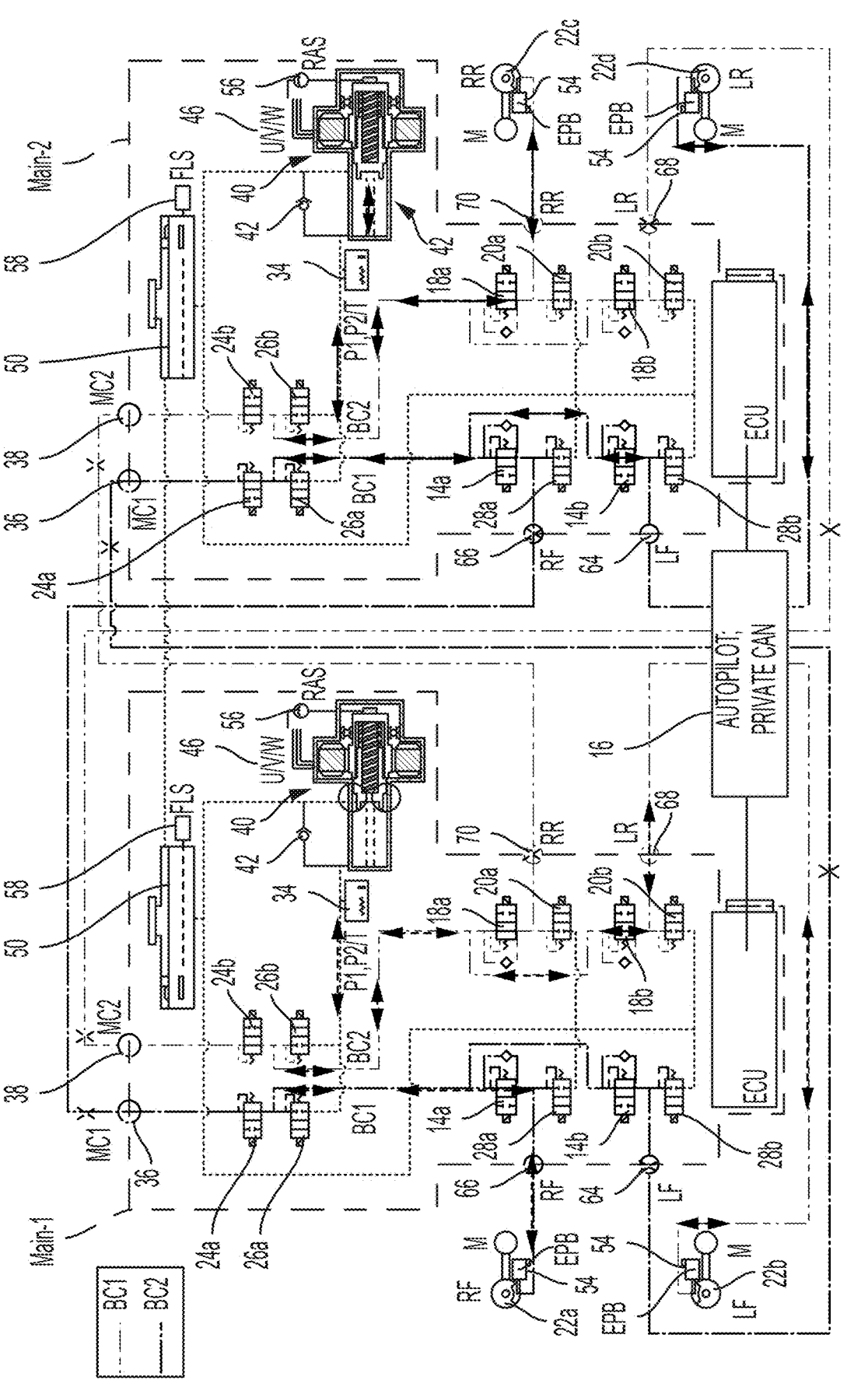
FIG. 4 illustrates the schematic diagram shown in FIG. 3 operating in a base brake modulation mode.

FIG. 4 shows a schematic diagram of the brake system illustrated in FIG. 3 while operating in a base brake modulation mode. During the base brake modulation mode, all eight ABS valves 14*a*, 14*b*, 20*a*, 20*b*, 28*a*, 28*b*, 32*a*, 32*b* are actuated in each of the units Main-1 and Main-2 during each application of the brake. The front wheel brakes RF, LF are applied and released by the first unit Main-1 and the rear wheel brakes RR, LR are applied and released by the second unit Main-2.

Figure 5:
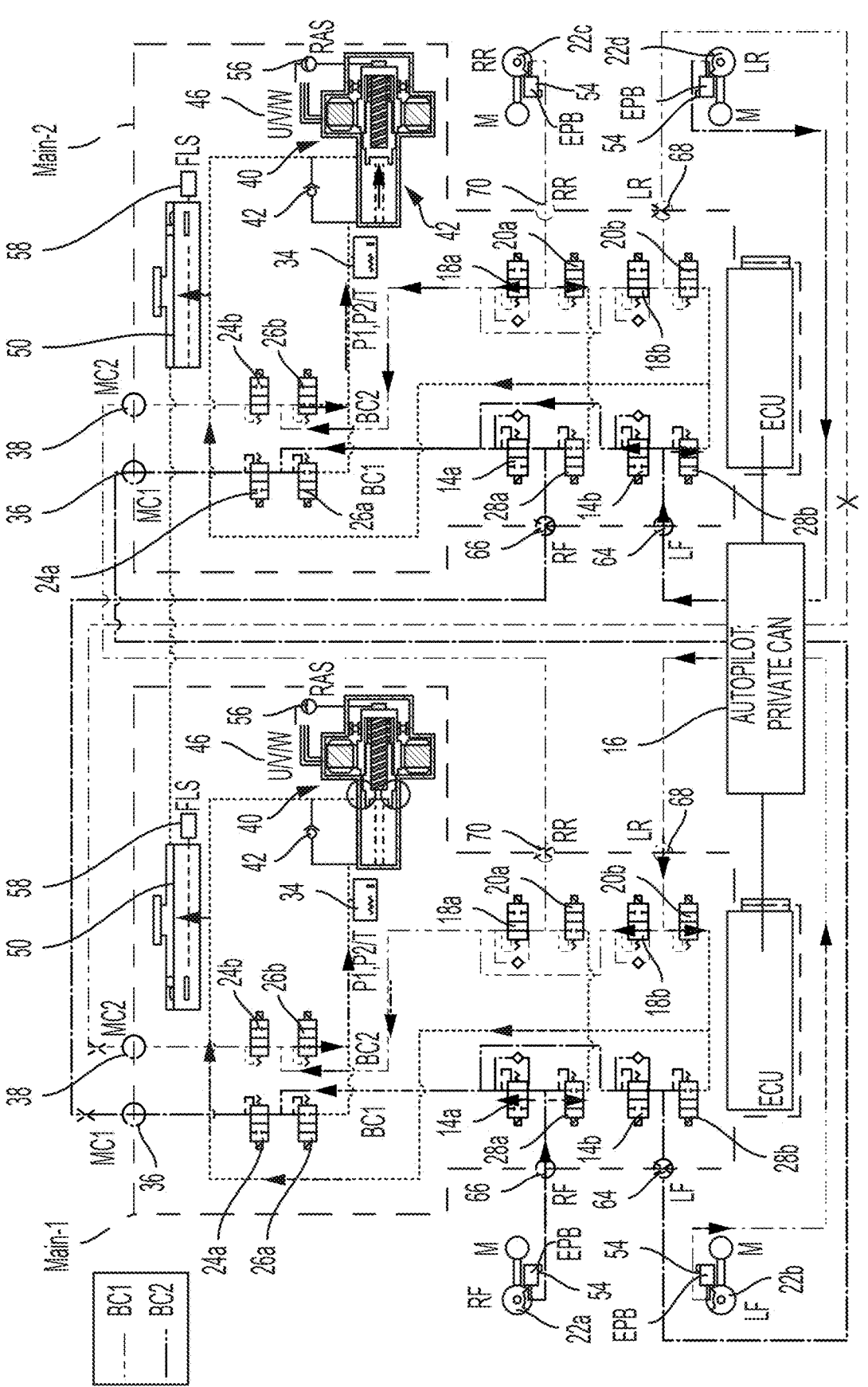
FIG. 5 illustrates the schematic diagram shown in FIG. 3 operating in an anti-lock braking system (ABS) release mode.

FIG. 5 shows a schematic diagram of the brake system illustrated in FIG. 3 while operating in an ABS release mode. The ABS release mode can be accomplished by one or more paths. As an example, activation of the release valves 28*a*, 28*b*, 20*a*, 20*b* may provide an immediate reduction of pressure in each of the fluid reservoirs. Alternatively or additionally, a second fluid path may be formed as fluid withdrawn back into each of the PSUs as each of the PSUs increase in volume to reduce overall brake pressure. Such an increase of the PSUs may reduce the total number of replenishments required.

Figure 6:
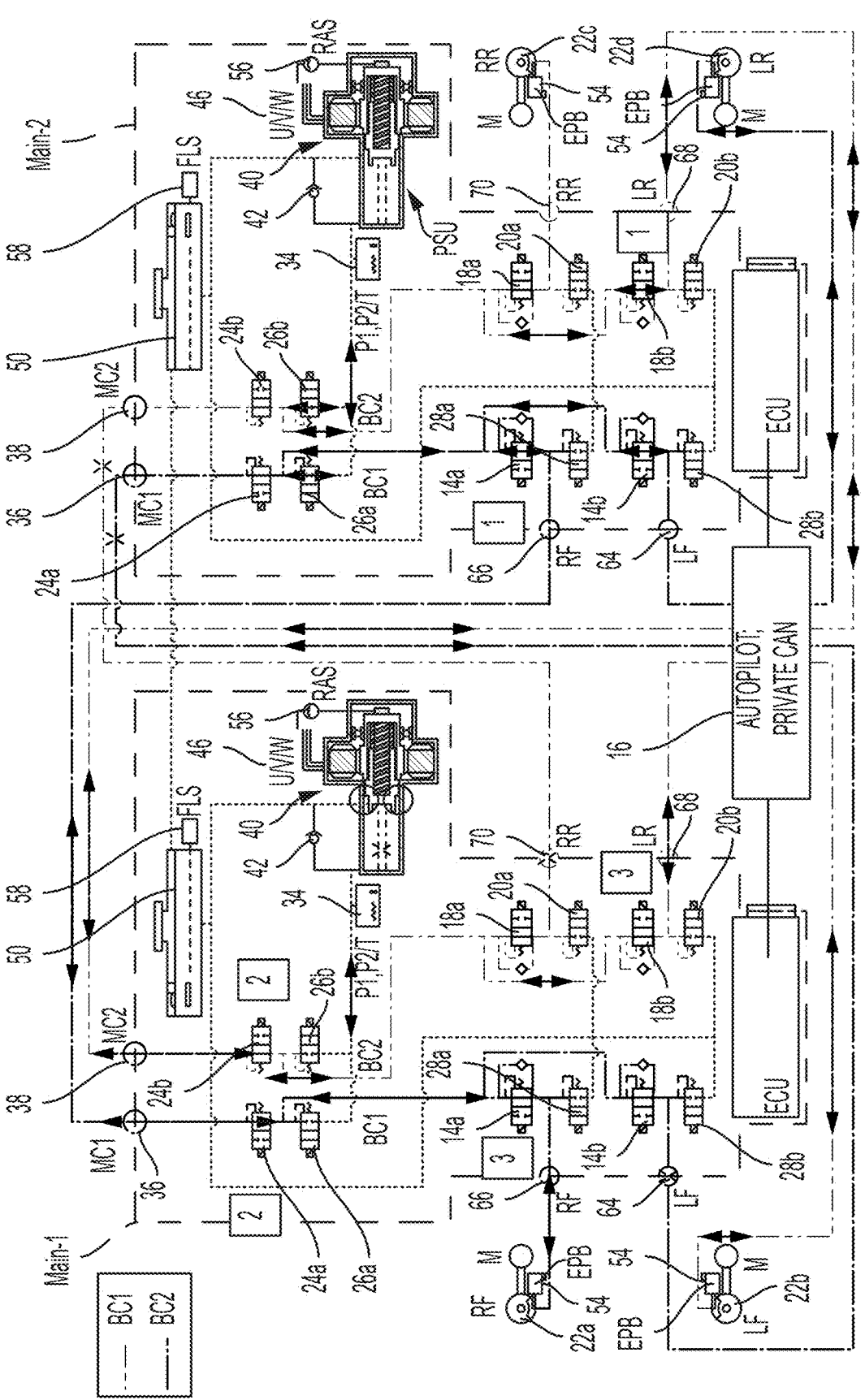
FIG. 6 illustrates the schematic diagram shown in FIG. 3 operating in an in-stop ECU failure mode.

FIG. 6 shows a schematic diagram of the brake system illustrated in FIG. 3 while operating in an in-stop ECU failure mode. As previously mentioned above, the first and second units Main-1, Main-2 of the brake system provides redundancy should one or more components (e.g., the ECU) of one of the two units fail to operate as intended. In the illustrated embodiment, the first unit Main-1 fails, and as such the normally open master cylinder isolation valves 24*a*, 24*b* are no longer energized. Accordingly, the PSU 40 of the second unit Main-2 is configured to pressurize each of the front brakes RF, LF through the control valves identified by blocked numbers 1, 2, and 3.

Figure 7:
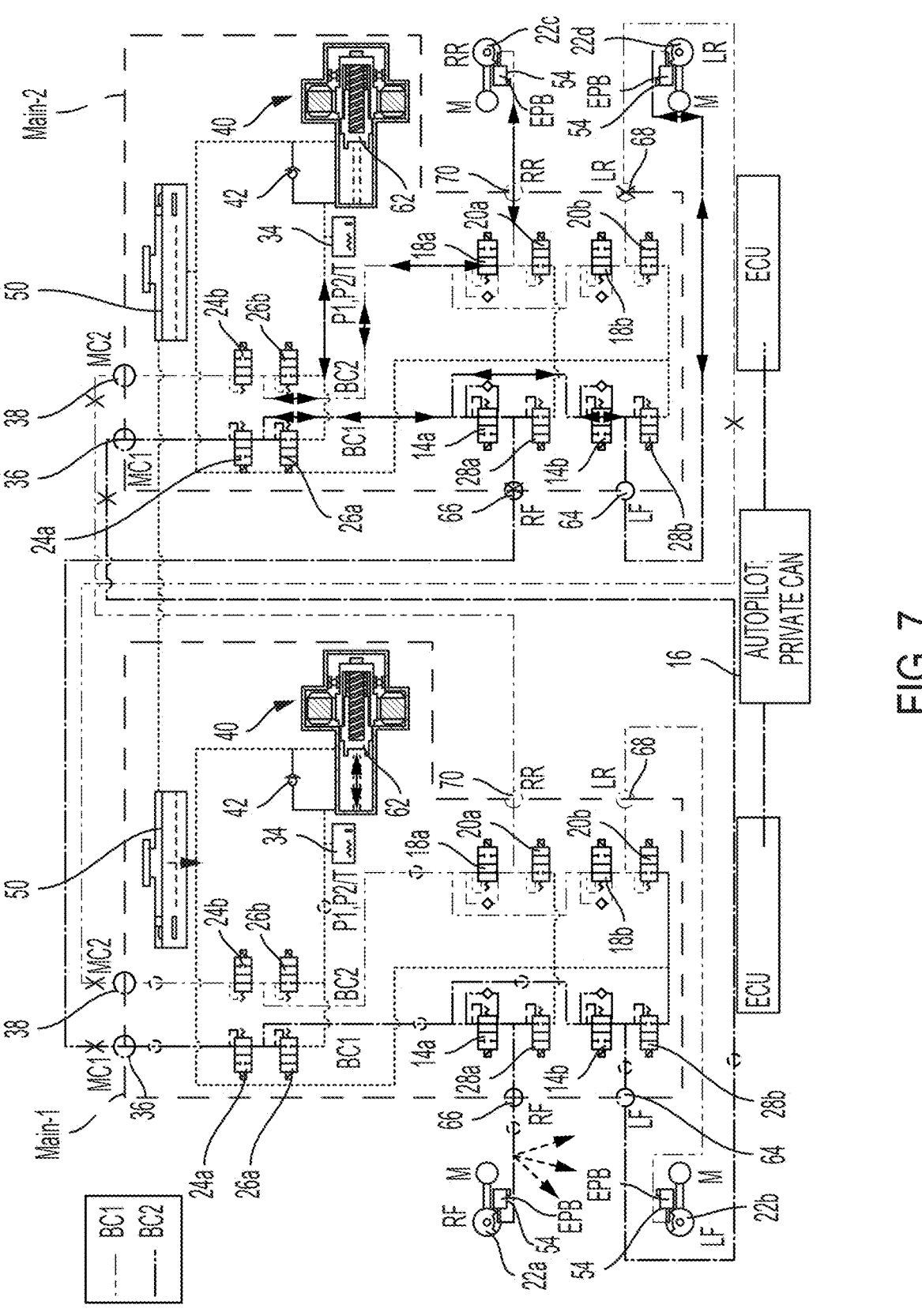
FIG. 7 illustrates the schematic diagram shown in FIG. 3 operating in a base brake failure mode.

FIG. 7 shows a schematic diagram of the brake system illustrated in FIG. 3 while operating in base brake failure mode. As one example, the base brake failure mode may be caused by a disconnection or opening between the right front wheel and the apply valve right front 14*a* and the release valve 28*a* causing a leak (as represented by the directional arrows). As such, during a base brake failure mode of one or more of the front brakes 22*a*, 22*b*, there is no pressure at the fluid connections to the front brakes RF, LF as indicated by "O." Accordingly, braking will only occur at the rear brakes 22*c*, 22*d* and at subsequent stops, each of the master cylinder isolation valves 24*a* 24*b* may continue to be activated to assure the first and second units Main-1, Main-2 remain isolated from one another.

As one example, each of the brake units may include a pair of normally closed control valves that may be arranged in parallel with one another. The inlets of the normally closed control valves may be fluidly connected to an outlet of the respective PSUs of each of the units Main-1 and Main-2. The outlets of the PSUs and the outlets of the normally open control valves may each define braking circuits (identified as BC1 and BC2). In one or more embodiments, each of the brake units may include a pair of normally open control valves that may be arranged in parallel with one another. The inlets of the normally open control valves may be fluidly connected to outlets of the normally closed control valves, and the outlets of the normally closed control valves may be fluidly connected to the outlet ports MC1 and MC2 of each of the units Main-1, Main-2.

Each electric motor of each of the PSUs may include a sensor (e.g., rotary angle sensor) that may be configured to measure the angular displacement of one or more components of each of the motors (e.g., motor rotor) or the linear position of the piston as a function of the pitch of the ball screw 60. Each of the fluid reservoirs may include a fluid level switch 58 configured to actuate in response to the levels of fluid within the fluid reservoirs exceeding or falling below a predetermined threshold. The fluid reservoirs may be fluidly connected to the respective PSUs.

In one or more embodiments, the first brake unit Main-1 may include two normally open valves that are fluidly connected in parallel to the normally closed control valve of brake circuit 1 BC1 and one of the two normally open valves may be connected to a separate wheel brake of brake circuit BC1 and the second normally open valve may be connected to a brake outlet port. The second brake circuit BC2 may include two normally closed valves that may be arranged in parallel with one another and connected to a separate wheel brake of the second brake circuit BC2, and the other valve may be connected to a brake outlet port.

The first brake circuit BC1 of the second unit Main-2 may include two normally open control valves arranged in parallel and fluidly connected to the normally closed control valve. One of the two normally open valves may be connected to a separate wheel brake associated with the first brake circuit BC1 of the second unit Main-2. The second brake circuit BC2 of the second unit Main-2 may include two normally closed valves arranged in parallel to one another and fluidly connected to the inlet of one of the valves connected to a separate wheel brake of the second brake circuit BC2 of the second main unit Main-2 and the other valve may be connected to a brake outlet port.

In one or more embodiments, a pressure sensor may be fluidly connected to the outlet circuit of each PSU. The brake system may include a number of fluid connections. As an example, a fluid connection may be provided between an overflow portion of a main brake system reservoir and a secondary (e.g., fallback) brake system reservoir. Another fluid connection may be provided between a brake port of the second brake circuit BC2 of the first unit Main-1 to the normally open control valve brake port of the first brake circuit BC1 of the second unit Main-2. In yet another embodiment, another fluid connection may be provided between the first brake circuit BC1 of the first unit Main-1 to the normally open control valve brake port of the first brake circuit BC1 of the second unit Main-2.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electro-hydraulic brake system for use in a driverless vehicle provided with a plurality of wheel brakes, the brake system comprising:
   a main controller configured to control driving operations of the driverless vehicle;
   a first main unit, wherein the first main unit, while operating in a normal mode, is configured to operate a first number of wheel brakes of the plurality of wheel brakes, the first main unit including,
      a first controller configured to control a first pair of wheel brakes of the plurality of wheel brakes in response to receiving first signals from the main controller,
      a first pressure supply unit (PSU) provided with a first PSU outlet,
      a first pair of normally-closed control valves configured to receive fluid from the first PSU outlet, and
      a first pair of normally-open control valves arranged fluidly parallel to one another and configured to receive fluid from outlets of the first pair of normally-closed control valves; and
   a second main unit, wherein the second main unit is selectively fluidly connected to the first main unit and, while operating in the normal mode, the second main unit is configured to operate a second number of wheel brakes of the plurality of wheel brakes, the first number of wheel brakes different than the second number of wheel brakes, the second main unit including,
      a second controller configured to control a second pair of wheel brakes of the plurality of wheel brakes in response to receiving second signals from the main controller,
      a second PSU provided with a second PSU outlet,
   a second pair of normally-closed control valves arranged fluidly parallel to one another and configured to receive fluid from the second PSU outlet, and
   a second pair of normally-open control valves arranged fluidly parallel to one another and configured to receive fluid from outlets of the second pair of normally-closed control valves;
   wherein in response to a fluid pressure within the first main unit falling below a predetermined threshold, the first controller is configured to command the first pair of normally-open control valves to close to fluidly isolate the first main unit from the second main unit.

2. The electro-hydraulic brake system of claim 1, wherein the first pair of normally-closed control valves are arranged fluidly parallel to one another.

3. The electro-hydraulic brake system of claim 1, further comprising:
   a first fluid reservoir disposed in the first main unit and configured to supply fluid to the first PSU;
   a second fluid reservoir disposed in the second main unit and configured to supply fluid to the second PSU; and
   a reservoir line fluidly connecting the first fluid reservoir to the second fluid reservoir.

4. The electro-hydraulic brake system of claim 1, wherein the first PSU includes an electric motor, a ball screw, and a piston, wherein the electric motor is operatively coupled to the ball screw and the piston so that as the electric motor is actuated, the ball screw is actuated to displace the piston and provide the pressurized fluid to the first pair of normally-closed control valves.

5. The electro-hydraulic brake system of claim 1, wherein the first main unit includes a first brake circuit and a second brake circuit, wherein the first brake circuit includes a first normally-closed control valve of the first pair of normally-closed control valves and a first normally-open control valve of the first pair of normally-open control valves, wherein first brake circuit is configured to operate a first wheel brake of the plurality of wheel brakes and the second brake circuit is configured to operate a second wheel brake of the plurality of wheel brakes.

6. The electro-hydraulic brake system of claim 1, wherein the main controller includes a controlled area network (CAN) bus.

7. An electro-hydraulic brake system for use in a driverless vehicle provided with a plurality of wheel brakes, the brake system comprising:
   a main controller configured to control driving operations of the driverless vehicle;
   a first main unit, wherein the first main unit, while operating in a normal mode, is configured to operate a first number of wheel brakes of the plurality of wheel brakes, the first main unit including,
      a first controller configured to control a first level of braking in response to receiving first signals from the main controller,
      a first pressure supply unit (PSU) provided with a first PSU outlet,
      a first pair of normally-closed control valves configured to receive fluid from the first PSU outlet, and
      a first pair of normally-open control valves arranged fluidly parallel to one another and configured to receive fluid from outlets of the first pair of normally-closed control valves, wherein the first pair of normally-open control valves are collectively configured to supply pressurized fluid to the first number of wheel brakes of the plurality of wheel brakes; and
   a second main unit, wherein the second main unit is selectively fluidly connected to the first main unit and, while operating in the normal mode, the second main unit is configured to operate a second number of wheel brakes of the plurality of wheel brakes, the first number of wheel brakes different than the second number of wheel brakes, the second main unit including,
      a second controller configured to control a second level of braking in response to receiving second signals from the main controller,
      a second PSU provided with a second PSU outlet,
   a second pair of normally-closed control valves arranged fluidly parallel to one another and configured to receive fluid from the second PSU outlet, and
   a second pair of normally-open control valves arranged fluidly parallel to one another and configured to receive fluid from outlets of the second pair of normally-closed control valves to supply pressurized fluid to the second number of wheel brakes of the plurality of wheel brakes,
   wherein the second controller is further configured to, responsive to the first controller malfunctioning, command the second PSU to provide the pressurized fluid to the first pair of normally-open control valves to operate the first number of wheel brakes of the plurality of wheel brakes.

8. The electro-hydraulic brake system of claim 7, wherein the second controller is further configured to command the second pair of normally-open valves to close in response to the first controller malfunctioning.

9. The electro-hydraulic brake system of claim 8, wherein the second controller is further configured to command the second pair of normally-closed valves to open in response to the first controller malfunctioning.

10. The electro-hydraulic brake system of claim 7, further comprising:

a first pair of apply valves disposed in the first main unit, the first pair of apply valves including a first apply valve and a second apply valve;

a second pair of apply valves disposed in the first main unit and including a third apply valve and a fourth apply valve;

a third pair of apply valves disposed in the second main unit and including a fifth apply valve and a sixth apply valve; and a fourth pair of apply valves disposed in the second main unit and including a seventh apply valve and an eighth apply valve, wherein the first apply valve of the first main unit is configured to receive the pressurized fluid from a first normally-open control valve of the first pair of normally-open control valves and provide the pressurized fluid to a first wheel brake of the first number of wheel brakes.

11. The electro-hydraulic brake system of claim 10, wherein the seventh apply valve and the eighth apply valve are arranged in series with respect to fluid flow, wherein the seventh apply valve is fluidly disposed between one normally-closed control valve of the second pair of normally-closed control valves and the eighth apply valve.

12. The electro-hydraulic brake system of claim 11, wherein a second normally-open control valve of the first pair of normally-open control valves is configured to receive the pressurized fluid from the eighth apply valve.

13. The electro-hydraulic brake system of claim 12, wherein the fourth apply valve is configured to supply the pressurized fluid to a second wheel brake of the first number of wheel brakes.

14. The electro-hydraulic brake system of claim 12, further comprising:

a first inlet valve disposed in the first main unit, the first inlet valve directly fluidly connected to the first normally-open control valve; and a second inlet valve disposed in the first main unit, the second inlet valve directly fluidly connected to the second normally-open control valve, wherein the second pair of normally-open control valves includes a third normally-open control valve and a fourth normally-open control valve, and wherein the first inlet valve is fluidly disposed between the first normally-open control valve and the third normally-open control valve.

15. An electro-hydraulic brake system for use in a driverless vehicle provided with a plurality of wheel brakes, the brake system comprising:

a main controller configured to control driving operations of the driverless vehicle;

a first main unit configured to operate a front right wheel brake and a front left wheel brake, the first main unit including, a first pressure supply unit (PSU), a first brake circuit configured to receive pressurized fluid from the first PSU, the first brake circuit including a first plurality of valves collectively configured to provide and receive pressurized fluid to and from the front right wheel brake a second brake circuit configured to receive pressurized fluid from the first PSU, the second brake circuit including a second plurality of valves collectively configured to provide and receive pressurized fluid to and from the front left wheel brake, a first controller in communication with the main controller, a second main unit configured to operate a rear right wheel brake and a rear left wheel brake, the second main unit including, a second PSU, a third brake circuit configured to receive pressurized fluid from the second PSU, the third brake circuit including a third plurality of valves collectively configured to provide and receive pressurized fluid to and from the rear right wheel brake, wherein the third brake circuit is selectively fluidly connected to the first brake circuit, a fourth brake circuit configured to receive pressurized fluid from the second PSU, the fourth brake circuit including a fourth plurality of valves collectively configured to provide and receive pressurized fluid to and from the rear left wheel brake, wherein the fourth brake circuit is selectively fluidly connected to the second brake circuit, and a second controller in communication with the main controller, wherein the first controller is configured to, responsive to receiving a first base brake modulation command from the main controller, activate the first plurality of valves and the second plurality of valves to apply and release the front right wheel brake and the front left wheel brake, and wherein the second controller is configured to, responsive to receiving a second base brake modulation command from the main controller, activate the third plurality of valves and the fourth plurality of valves to apply and release the rear right wheel brake and the rear left wheel brake.

16. The electro-hydraulic brake system of claim 15, further comprising:

a first isolation valve fluidly coupled to the first brake circuit and the third brake circuit, wherein the first controller is further configured to command the first isolation valve to close in response to receiving the base brake modulation command.

17. The electro-hydraulic brake system of claim 16, wherein the first plurality of valves includes a PSU valve configured to directly receive the pressurized fluid from the first PSU and wherein the PSU valve is disposed between the first isolation valve and the first PSU.

18. The electro-hydraulic brake system of claim 17, further comprising:

a second isolation valve fluidly coupled to the second brake circuit and the fourth brake circuit, wherein the first controller is further configured to command the second isolation valve to close in response to receiving the base brake modulation command.

19. The electro-hydraulic brake system of claim 18, further comprising:

a third isolation valve fluidly coupled to the third brake circuit and the first brake circuit, wherein the first, second, and third isolation valves are normally open, and wherein the second controller is further configured to, responsive to the first controller malfunctioning, command the third isolation valve to close so that the third brake circuit provides pressurized fluid to the first brake circuit.

20. The electro-hydraulic brake system of claim 19, further comprising:

a fourth isolation valve fluidly coupled to the fourth brake circuit and the second brake circuit, wherein the fourth isolation valve is normally open, and wherein the second controller is further configured to, responsive to a loss in hydraulic pressure in at least one of the first brake circuit and the second brake circuit, command the first, second, third, and fourth isolation valves to close.

\* \* \* \* \*